United States Patent

Shimada et al.

[11] Patent Number: 5,319,271
[45] Date of Patent: Jun. 7, 1994

[54] PULSE SIGNAL GENERATING DEVICE
[75] Inventors: Hideki Shimada, Yonago; Yoshifumi Shimogaki, Tottori; Motoyoshi Kawai, Yonago, all of Japan
[73] Assignee: Matsushita Electric Industrial Co., Ltd., Osaka, Japan
[21] Appl. No.: 919,143
[22] Filed: Jul. 23, 1992
[30] Foreign Application Priority Data
  Jul. 25, 1991 [JP] Japan .................. 3-186127
[51] Int. Cl.⁵ .................................. H02K 11/00
[52] U.S. Cl. .................... 310/68 B; 310/DIG. 3
[58] Field of Search ............... 310/68 B, 156, 254, 310/261, 40 MM, 48, DIG. 3, DIG. 6

[56] References Cited
U.S. PATENT DOCUMENTS
4,874,976 10/1989 Ohsawa et al. ............ 310/DIG. 3
4,952,830 8/1990 Shirakawa ................... 310/68 B Primary Examiner—Steven L. Stephan
Assistant Examiner—Matthew Nguyen
Attorney, Agent, or Firm—Renner, Otto, Boisselle & Sklar

[57] ABSTRACT

A DC motor pulse signal generating device comprising a DC motor including a rotor frame with a magnet for pulse generation and a substrate for supporting the rotor frame. A magnetic sensor is mounted on the substrate for detecting magnetic flux generated from the magnet and outputting a signal. A positioning groove is formed on the substrate to receive the magnetic sensor on a fixed position. Thereby, the gap between the magnetic sensor and the magnet is fixed so that stable pulses are generated, and the height of the center of the magnetic sensor is lowered to the level of the center of the magnet so that magnetic flux is detected most efficiently by the magnetic sensor.

3 Claims, 1 Drawing Sheet

T = HEIGHT OF FG MAGNET FROM PRINTED BOARD

U.S. Patent   June 7, 1994   5,319,271
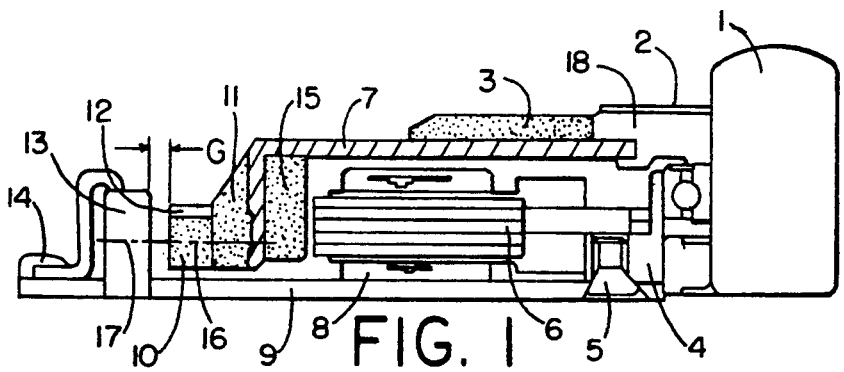
FIG. 1
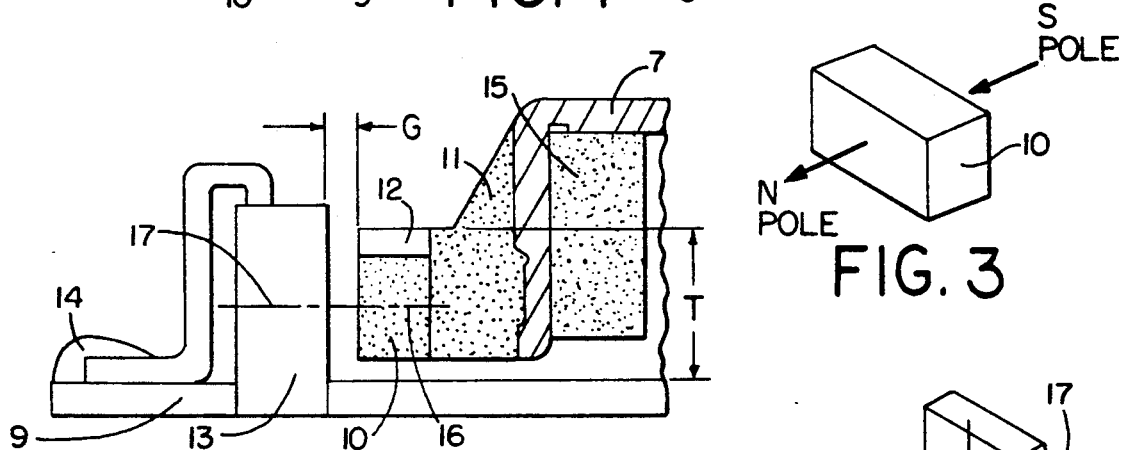
T = HEIGHT OF FG MAGNET FROM PRINTED BOARD
FIG. 2
FIG. 3
CENTER OF MAGNETIC SENSOR
FIG. 4
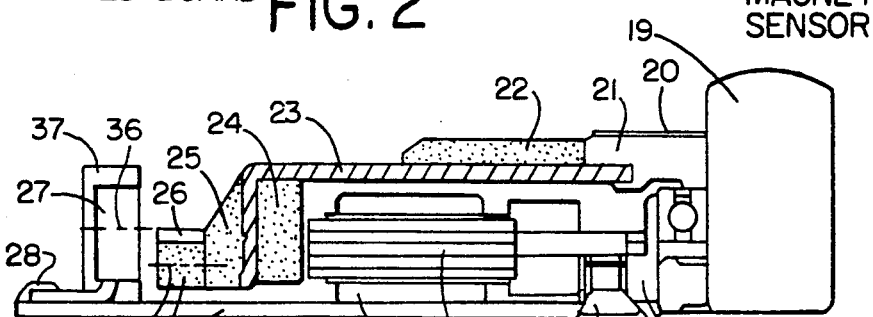
FIG. 5
PRIOR ART
G = GAP BETWEEN MAGNETIC SENSOR AND PG MAGNET
T = HEIGHT OF FG MAGNET FROM PRINTED BOARD
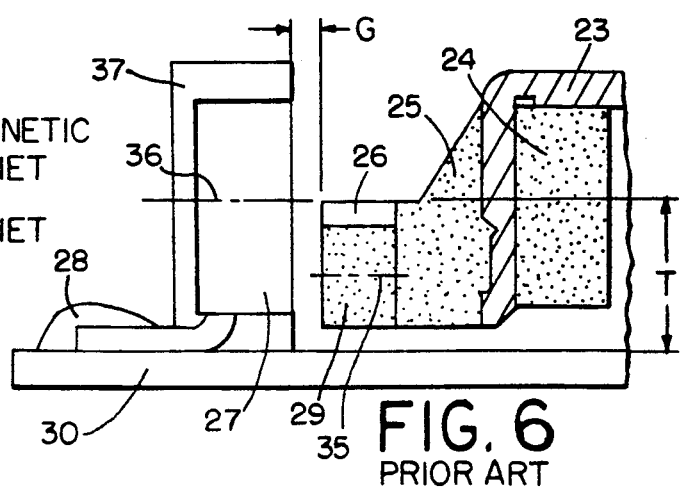
FIG. 6
PRIOR ART

PULSE SIGNAL GENERATING DEVICE

BACKGROUND OF THE INVENTION

1. Field of the Invention

The present invention relates to a pulse signal generating device of a direct-current (DC) electric motor used for office automation appliances.

2. Description of the Prior Art:

In recent years, a thinner and less expensive floppy disk drive (FDD) has been realized. To be adaptable for such a floppy disk drive, a DC motor pulse signal generating device is also required to be thin and inexpensive while the efficiency thereof is enhanced. To achieve this, it is essential for the DC motor pulse signal generating device to generate pulses with a stabilized waveform and minimize leakage of magnetic flux.

A conventional DC motor pulse signal generating device will be described with reference to FIGS. 5 and 6. FIG. 5 shows a vertical sectional view of a half part of a conventional DC motor pulse signal generating device which comprises a rotor including a shaft 19, a housing 21 fitted in the shaft 19, and a rotor frame 23 fixed to the housing 21 with caulking. A Teflon sheet 20 is attached to the housing 21. A hub magnet 22 and a frequency generating (FG) magnet 25 are formed by integral molding with the rotor frame 23. A rotor magnet 24 is attached to the inner surface of the rotor frame 23. A pulse generating (PG) magnet 29 is fitted in a groove formed on the circumferential side face of the FG magnet 25. The top surface of the PG magnet 29 is covered with a shield plate 26 so that leakage of magnetic flux from the PG magnet 29 is minimized.

The DC motor pulse signal generating device also comprises a printed board 30 to which a core 32 and a bearing 34 are fixed with a pin 33. A coil 31 is wound around the core 32. A magnetic sensor 27 for generating magnetic index pulses is also fixed to the printed board 30 through a support of a holder 37 at a position appropriately spaced apart from the circumferential end face of the FG magnet 25. A terminal of the magnetic sensor 27 is fixed to the printed board 30 with a solder 28.

The operation of the conventional DC motor pulse signal generating device with the above-described structure will be described.

FIG. 6 is an enlarged view of a main portion of FIG. 5. The magnetic sensor 27 detects a magnetic flux from the PG magnet 29 fitted in the groove of the rotating FG magnet 25 once every rotation thereof. The waveform of the detected flux is shaped through an amplifying circuit and a Schmitt trigger circuit known in the art, so that a pulse signal is generated every rotation.

In the conventional pulse signal generating device, the height T of the FG magnet 25 from the surface of the printed board 30 is restricted to a certain level so that the FG magnet 25 does not hit the magnetic head of an FDD. As a result, the positions of the magnetic center of the PG magnet 29 shown by a reference numeral 35 and the center of the magnetic sensor 27 shown by a reference numeral 36 are not on the same level, but the former is lower than the latter. Accordingly, the strongest magnetic flux generated from the magnet center 35 of the PG magnet 29 is not effectively detected by the center 36 of the magnetic sensor 27. FIGS. 3 and 4 show enlarged views of the PG magnet and the magnetic sensor in perspective, respectively, for reference.

To make the magnetic sensor operative under the above-described condition, it is necessary to use a magnet having a high magnetic energy product, such as samarium cobalt and neodymium iron with a high residual flux density. The use of such magnets results in a cost increase and also leakage of magnetic flux from the PG magnet 29 made of these magnets is increased.

Furthermore, in the conventional pulse signal generating device, the holder 37 is used to fix the magnetic sensor 27 to the printed board 30. This requires additional cost. Moreover, since the magnetic sensor 27 is not provided with a positioning mechanism, it tends to incline itself, and also an air gap G between the magnetic sensor 27 and the PG magnet 29 tends to vary both within a device and between devices. As a result, pulses generated from the magnetic sensor 27 can not be stabilized.

The objective of the present invention is to provide an inexpensive DC motor pulse signal generating device capable of generating stable pulses with reduced leakage of flux.

SUMMARY OF THE INVENTION

The DC motor of the present invention comprises; a rotor including a shaft, a rotor frame fixed to the shaft, and a rotor magnet fixed to the rotor frame, and a stator including a substrate and a bearing mounted on the substrate to receive the shaft; the rotor frame having a first magnet, and a second magnet fitted in the first magnet; the substrate having a core with a coil wound therearound for applying a magnetic force to the rotor magnet, a positioning groove, and a magnetic sensor fitted in the positioning groove: the magnetic sensor detecting magnetic flux generated by the second magnet rotating around the shaft and outputting a signal corresponding to the rotation of the rotor.

In another aspect of the present invention, a pulse signal generating device is presented, which comprises; a DC motor including a rotor with a magnet for pulse generation and a stator for supporting the rotor, a magnetic sensor mounted on the stator for detecting flux generated by the magnet and outputting a signal, and a means for generating a pulse signal corresponding to the receipt of the signal from the magnetic sensor; the rotor having a shaft, a rotor frame fixed to the shaft, and a rotor magnet fixed to the rotor frame; the rotor frame having a first magnet, and a second magnet fitted in the first magnet, the second magnet functioning as the magnet for pulse generation; the stator having a substrate and a bearing mounted on the substrate to support the shaft; the substrate having a core with a coil wound therearound for applying a magnetic force to the rotor magnet, and a positioning groove; the magnetic sensor being fitted in the positioning groove.

Thus, the invention described herein makes possible the advantage of providing an inexpensive DC motor pulse signal generating device capable of generating stable pulses with reduced leakage of flux.

This and other advantages of the present invention will become apparent to those skilled in the art upon reading and understanding the following detailed description with reference to the accompanying figures.

BRIEF DESCRIPTION OF THE DRAWINGS

FIG. 1 is a vertical sectional view showing a half part of a DC motor pulse signal generating device of the present invention;

FIG. 2 is a partial enlarged view of the DC motor pulse signal generating device of FIG. 1;

FIG. 3 is a schematical perspective view of a PG magnet;

FIG. 4 is a schematical perspective view of a magnetic sensor;

FIG. 5 is a sectional view showing a half part of a conventional DC motor pulse generating device; and FIG. 6 is a partial enlarged view of the DC motor pulse signal generating device of FIG. 5.

DESCRIPTION OF THE PREFERRED EMBODIMENT

Referring to FIG. 1, the DC motor pulse signal generating device of the present invention comprises a rotor including a shaft 1 having a length of 7.75 mm and a diameter of 3.99 mm, a housing 18 fitted in the shaft 1, and a rotor frame 7 fixed to the housing 18 with caulking. A Teflon sheet 2 is attached to the housing 18. A hub magnet 3 and a frequency generating (FG) magnet 11 are formed by integral molding with the rotor frame 7. A rotor magnet 15 is attached to the inner surface of the rotor frame 7. A pulse generating (PG) magnet 10 is fitted in a groove formed on the circumferential side face of the FG magnet 11. The top surface of the PG magnet 10 is covered with a shield plate 12 so that leakage of flux from the PG magnet 10 is minimized. The shield plate 12 is made of metal.

The DC motor pulse signal generating device also comprises a printed board 9 (thickness: 0.62 mm) to which a core 6 and a bearing 4 are fixed with a fixing pin 5. The printed board 9 is made of metal. The core 6 has a multilayer structure of five silicon steel plates with a thickness of 0.35 mm. A coil 8 is wound around the core 6. A groove with a size of 4.66 mm × 1.6 mm is formed on the printed board 9 to receive and position a magnetic sensor 13 in a reverse state. The magnetic sensor 13 is further fixed to the printed board 9 with a solder 14. Preferably, a Hall device or Hall IC is used for the magnetic sensor 13. The height of the magnetic sensor 13 is typically about 3 mm.

The operation of the DC motor pulse signal generating device having the above-described structure will be described with reference to FIG. 2.

FIG. 2 is an enlarged view of a main portion of FIG. 1. The magnetic sensor 13 detects a magnetic flux generated from the PG magnet 10 fitted in the groove of the rotating FG magnet 11 once every rotation thereof. The waveform of the detected flux is shaped through an amplifying circuit and a Schmitt trigger circuit known in the art, so that a pulse signal is generated every rotation.

Since the magnetic sensor 13 is fitted in the positioning groove in a reverse state, the position of the center of the magnetic sensor 13 shown by a reference numeral 17 can be lowered to the same level as that of the magnetic center of the PG magnet 10 shown by a reference numeral 16. According to this example, the height of the center 17 of the magnet sensor 13 can be positioned lower by at least 1.0 mm than that of the conventional one. FIGS. 3 and 4 show enlarged views of the PG magnet and the magnetic sensor in perspective, respectively, for reference.

As described above, according to the DC motor pulse signal generating device of the present invention, the groove for positioning the magnetic sensor 13 is formed on the printed board 9. Therefore, a holder for the magnetic sensor 13, as well as attaching and fixing means thereof, are not required. This reduces cost. Further, the center 17 of the magnetic sensor 13 can be lowered to the level equal to or near the magnetic center 16 of the PG magnet 10. According to this example, the height difference between the center 17 of the magnetic sensor 13 and the magnetic center 16 of the PG magnet 10 can be reduced to 0±0.2 mm from the conventional 1.0±0.2 mm. Therefore, a magnet having a low magnetic energy product, such as strontium ferrite with a low residual flux density, can be used. As a result, the cost can be reduced and also leakage of magnetic flux from the PG magnet 10 can be reduced. Furthermore, since the gap between the magnetic sensor 13 and the PG magnet 10 is stabilized to substantially about 0.5 mm., stable pulses can be generated from the magnetic sensor 13.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A DC motor comprising:

a rotor including a shaft, a rotor frame fixed to said shaft, and a rotor magnet fixed to said rotor frame; and a stator including a substrate and a bearing mounted on said substrate to receive said shaft;

said rotor frame having a first magnet, and a second magnet fitted in said first magnet;

said substrate having a core with a coil wound therearound for applying a magnetic force to said rotor magnet, a positioning groove, and a magnetic sensor fitted in said positioning groove;

said magnetic sensor detecting magnetic flux generated by said second magnet rotating around said shaft and outputting a signal corresponding to the rotation of said rotor; and wherein said magnetic sensor comprises first and second opposite end faces and a terminal extending from said first end face, said magnetic sensor being positioned so that said first end face is located farther from said substrate than said second end face, and the height of the center between said first and second end faces from said substrate is substantially equal to that of the magnet center of said second magnet from said substrate.

2. A pulse signal generating device, comprising:

a DC motor including a rotor with a magnet for pulse generation and a stator for supporting said rotor;

a magnetic sensor mounted on said stator for detecting flux generated by said magnet and outputting a signal; and a means for generating a pulse signal corresponding to the receipt of the signal from said magnetic sensor;

said rotor having a shaft, a rotor frame fixed to said shaft, and a rotor magnet fixed to said rotor frame;

said rotor frame having a first magnet, and a second magnet fitted in said first magnet, said second magnet functioning as said magnet for pulse generation;

said stator having a substrate and a bearing mounted on said substrate to support said shaft;

said substrate having a core with a coil wound therearound for applying a magnetic force to said rotor magnet, and a positioning groove;

said magnetic sensor being fitted in said positioning groove; and wherein said magnetic sensor comprises first and second opposite end faces and a terminal extending from said first end face, said magnetic sensor being positioned so that said first end face is located farther from said substrate than said second end face, and the height of the center between said first and second end faces from said substrate is substantially equal to that of the magnet center of said second magnet from said substrate.

3. A DC motor, comprising:

a rotor including a shaft and a rotor frame fixed to said shaft;

a stator including a substrate and a bearing mounted on said substrate to receive said shaft;

said rotor frame having a magnet attached thereto;

said substrate having a positioning groove and a magnetic sensor fitted in said positioning groove; and wherein said magnetic sensor detects magnetic flux generated by said magnet rotating around said shaft and outputs a signal corresponding to the rotation of said rotor, and the height of the center of said magnetic sensor from said substrate is substantially equal to that of the magnetic center of said magnet from said substrate.

* * * * *